United States Patent Office 3,447,949
Patented June 3, 1969

3,447,949
ABRASION RESISTANT POLYURETHANE COATING FOR STEEL
Robert L. Singer, St. Louis, Mo., assignor to Magna Visual, Inc., St. Louis, Mo., a corporation of Missouri
No Drawing. Filed Feb. 11, 1965, Ser. No. 431,992
Int. Cl. B44d 1/34
U.S. Cl. 117—75                 2 Claims

ABSTRACT OF THE DISCLOSURE

A strongly adherent abrasion resistant coating for steel and the like. The coating composition is comprised of a base coat of a major amount of a polyurethane and a minor amount of an epoxy resin, and a top coat consisting mainly of a polyurethane. The polyurethane in the base coat has a lower NCO content than the NCO content in the top coat which provides for grater adherence of the base or prime coat, coupled with a degree of resiliency acting as a shock absorber, while the top coat has a higher degree of abrasion resistance.

SUMMARY OF THE INVENTION

It is a feature of this invention that there has been provided a coating for steel and other metallic surfaces which has a high degree of adherence to the base structure, and provides a high degree of abrasion resistance, many times that of the base material. The coating used in grain chutes, or other metallic surfaces subject to abrasion, can be simply applied to the surface to prevent corrosion. Further, for use in grain chutes, the coating, which has insulating properties and a high dielectric strength, inhibits the build up of static electricity charges and thereby suppresses the likelihood of grain elevation explosions. It will be understood that the coating has a wide adaptability of use on metallic surfaces and is not limited to this usage, and can be employed for corrosion resistance caused by various chemicals and the like.

Essentially, the coating employs at least one basecoat of a polyurethane and an epoxy resin to provide a very firm adherence to the metallic base structure. This coating is then followed by at least one topcoat consisting essentially of a polyurethane in which the NCO content is of a higher degree than in the basecoat. The topcoat may be of a different color than the basecoat so that when it is eventually eroded this can be determined visually and another topcoating can be applied. The topcoat has a relatively greater abrasion resistance than the bottom coat, which, in turn, has a relatively higher degree of adherence to metal than the topcoat. When the basecoat and the topcoat are used together, there is a firm degree of adhesion between the two so that stripping of the basecoat from the topcoat is avoided, and the entire coating resists stripping from the base surface. Further, the basecoat is somewhat softer than the topcoat and has a degree of resilience so that it acts as a shock absorber when the topcoat is applied to it, which is of an advantage in handling moving materials that contact the coating.

The protective coating of this invention can be simply cured by conventional catalysts or air cured and can be applied by relatively unskilled workmen to provide a coated metallic surface having a long degree of life with a high degree of abrasion resistance.

The above features are objects of this invention and further objects will appear in the detailed description which follows and will be otherwise apparent to those skilled in the art.

THE DISCLOSURE

For the purpose of illustration, there will be described a typical basecoat composition and a topcoat composition. It will be understood that the basecoat may be used in the nature of a single coating or plural coatings, where desired, and that this will likewise be true for the top coating.

A typical example will be described below giving an exemplary formulation for the basecoat and topcoat in which the parts are listed by weight.

EXAMPLE

| Basecoat: | Parts |
|---|---|
| Polyurethane resin | [1] 96 |
| Epoxy resin | 4 |
| Pigment titanium dioxide | 10 |

[1] NCO content about 4.1%.

| Topcoat: | Parts |
|---|---|
| Polyurethane resin | [1] 20 |
| Pigment iron oxide $Fe_2O_3$ | 1 |

[1] NCO content about 6.3%.

In the basecoat, the polyurethane is Adiprene L–100, manufactured by E. I. du Pont de Nemours & Company, in liquid form having a viscosity at 85° F. of about 18,000 centipoise. The urethane is an isocyanate and polyether prepolymer having an NCO content of about 4.1%. It will be understood that the polyether may be substituted in whole or in part by a polyester, and that the NCO content may be varied somewhat, as will be well understood in the art. The basecoat may be cured by the employment of a catalyst, such as methyl ortho chloraniline, or other catalysts, such as tri methylol propane or other polyols providing a source of active hydrogen. The pot life is approximately 1 hour when using the former catalyst. It will be understood that air curing may likewise be employed using longer periods of time. The basecoat composition to the catalyst is employed in the ratio of about 3½ to 1. It will be understood that various solvents may be employed for solution, such as methyl ethyl ketone, to provide the desired degree of fluidity.

The epoxy employed is that conventionally prepared by condensing epichlorhydrin with 2,2'-bis(p-hydroxy phenyl) propane, sold by Shell Chemical under the trademark Bisphenol-A. The epoxy resin, as an example, may be one that is liquid having an epoxide equivalent of 175 to 210, such as that made by Shell Chemical Corporation as Epon 828. The epoxy is employed advantageously because it aids very greatly in providing a strong adhesive bond to steel.

In the topcoat the polyurethane employed has an NCO content of about 6.3%. Here again it will be understood that this ratio may be varied depending upon the hardness of the film desired, but such a polyurethane as described and sold under the trademark Adiprene L–167 by du Pont has been found to be very desirable. This polyurethane has a viscosity of about 6,000 CPS. In order to impart a color different than the white color of the base, one part of iron oxide ($Fe_2O_3$) is employed in the composition. The topcoat, like the basecoat, may be cured using various catalysts, providing active hydrogen and methyl ortho chloraniline has been found to be desirable. The topcoat to catalyst ratio employed is about 2.38 to 1. The topcoat, like the basecoat, can be made of varying degrees of fluidity using conventional solvents such as methly ethyl ketone. These solvents can be mixed in with the catalyst, and in the proportions listed for the basecoat and the topcoat of the coating composition of the catalyst, methyl ethyl ketone is premixed in the foregoing examples listed, to provide four parts of the methyl ortho chloraniline to five parts of the methyl ethyl ketone.

In the employment of the basecoat and the topcoat compositions, it will be understood that the catalyst is not added to the coating composition for either the basecoat or the topcoat until the coating composition is ready to be applied to the steel surface to be coated. When the coating composition is desired to be used, then the catalysts and the basecoat or the topcoat composition are mixed together to provide a pot life of about one hour, providing ample time for application. Until such use the coating composition and the catalysts are kept separate.

USE

The coating compositions of this invention can be very simply applied to a surface to be protected. Thus, on a steel surface to provide the protective coating, the basecoat is first mixed with the catalyst and then adjusted, if required, to the desired degree of fluidity by adding conventional solvents, such as methyl ethyl ketone, and the like. The basecoat provides adhesion to the surface on which it is to be applied, and also provides what amounts to a shock absorber action for the topcoat. The coat is pigmented white in color, or any other desirable color that sets it off from the ultimate topcoat, so that when the topcoat is worn through this can be determined visually.

Application of the basecoat is made to the steel surface which is first cleaned in conventional fashion. Thus, sand blasting of the steel surface, followed by application of solvents such as methyl ethyl ketone for cleaning it may be first carried out. The basecoat then after being mixed with a catalyst can be applied by a brush, or other conventional means of application. After permitting appropriate time for drying, the basecoat, which may be simply one coat or more, depending upon the desired degree of thickness, is followed by application of the topcoat.

The topcoat application is made in essentially the same fashion as the basecoat. Thus, the composition is mixed with the catalyst for curing and then applied by a brush to the basecoat. The topcoat likewise may be used in one or more coatings, depending upon the desired degree of thickness of the coating. The brown pigmentation of the topcoat, and here again it should be understood that any pigmentation may be employed just as long as it is distinct from the basecoat, provides for visual determination when the topcoat has worn through ultimately to expose the basecoat signifying that a new application of another topcoating is required. The topcoating bonds and essentially becomes integral with the basecoat, and through the joint action of the basecoat and the topcoat a very firm and tenacious coating has been supplied. The topcoating has not the degree of adherence or adhesion to metal as the basecoat, nor does it have the resilience or bounce aspect, but it does have the quality of adhering and essentially integrating with the basecoat. Further, the topcoat has a much greater abrasion resistance than the basecoat and through the combination with the basecoat a composite coating has been supplied that has all of the desired properties of ease of application, strong adherence to metal, shock absorber action, and a high degree of abrasion resistance.

The coating is resistant to most chemicals, gasoline, oil, salt, calcium chloride, caustic, water, and hot air. Thus, it provides a high degree of protection to the surface to which it is applied, essentially steel, but also other types of metal or other base strata. The coating, when dry, is exceedingly tough and flexible, and further enjoys ease of application by conventional methods of coating, such as brushing, spraying, roller coating, or dipping.

The composition of this invention can be used to provide basecoats or topcoats varying from one-half mil to one mil per coat, or more, depending upon the degree of thinning, and an ultimaate thickness after multi-application may be five mils or more. The dielectric strength of the coating is quite excellent in the order of 740 volts per mil thickness. The coating may further be applied to conveyor belts of fabric or rubber, and penetration may be effected by thinning to the desired degree. The toughness and flexibility of the coating permits it to be used on moving belts that pass over rollers, idlers, and the like. Further applications are upon various types of electrical equipment or piping to provide insulation or waterproof and sealing characteristics. Likewise, application may be made on concrete, masonry, wood, and the like, for protection and waterproofing.

The particularly significant feature of this invention is the adherence to metal and specifically steel, which, in the past, has been quite hard to provide with a tenacious and adherent coating. The abrasion resistance of steel when coated with the coating composition of this invention is very vividly portrayed according to comparative tests conducted in accordance with ASTM 968–51. In these tests Carborundum and sand are employed to abrade steel and steel coated with a coating composition of this invention. In such tests the coated composition showed a resistance to abrasion of about 8 to 10 times that of uncoated steel. These results are shown in the table below. In this table the two digits referred to in the coating number have the significance that the first digit is the percent of epoxy employed in the base coating, while the second number is the number of coats of the top coating. A single basecoat was employed.

| Coating | Loss, mils | Liters Carborundum | Sand | Abrasion coefficient (liters per mil) | |
|---|---|---|---|---|---|
| | | | | Carborundum | Sand |
| #22 at 200° F | 18.5 | 185 | | 10.00 | 15.60 |
| #24 at 200° F | 20.8 | 180 | | 8.65 | 13.49 |
| #42 at 200° F | 17.1 | 134 | | 7.84 | 12.23 |
| #44 at 200° F | 19.8 | 155 | | 7.83 | 12.21 |
| Steel | 30.3 | 31 | | 1.02 | |
| Do | 19.5 | | 31 | | 1.59 |

From the results in the tests listed in the above table, it will be seen that the resistance to abrasion is many times that for the steel coated with the coating composition of this invention as compared to uncoated steel. The value of the coating composition for various types of structures, such as grain elevators, chutes, and the like, is readily significant. Further, the cost of building up the eventually abraded coating is relatively low and the ease of build up is greatly advantageous over the use of uncoated steel, which formerly had to be replaced when abraded rather than merely recoated with the coating composition of this invention.

Further, the repair and replacement may be made on the site by using the coating composition of the instant invention.

Various changes and modifications may be made, such as varying the NCO to OH ratios in the polyurethane, using different types of polyethers or polyesters in the isocyanate prepolymer, varying the epoxy employed in the basecoat, and the like. Such changes and modifications will be readily apparent to those skilled in the art and are within the scope and teaching of this invention as defined by the claims appended hereto.

What is claimed is:

1. A metallic body having an abrasion resistant insulating coating characterized by its high dielectric strength, adhesion, and ability to inhibit the build up of static electricity, said coating comprising a basecoat consisting essentially of a major amount of a polyurethane and a minor amount of an epoxy resin and a topcoat consisting essentially of a polyurethane, the polyurethane in said basecoat having an NCO content of about 4% and the NCO content in the topcoat being about 6%.

2. A metallic body having an abrasion resistant insulating coating for steel and the like characterized by its high dielectric strength, adhesion, and ability to inhibit the build up of static electricity, said coating comprising at least one basecoat consisting essentially of about 96 parts of a polyurethane and 4 parts of an epoxy resin, at least one topcoat comprised essentially of a polyurethane, the polyurethane in said basecoat having an NCO content of about 4% and the polyurethane in said topcoat having an NCO content of about 6%.

References Cited

FOREIGN PATENTS 640,547   5/1962   Canada.

ALFRED L. LEAVITT, *Primary Examiner.*

J. A. BELL, *Assistant Examiner.*

U.S. Cl. X.R.

117—132